United States Patent
Qian (10) Patent No.: US 9,927,919 B2
(45) Date of Patent: Mar. 27, 2018

(54) ARRAY SUBSTRATE, DRIVE METHOD, DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Xu Qian, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 45 days.

(21) Appl. No.: 14/961,684

(22) Filed: Dec. 7, 2015

(65) Prior Publication Data
US 2016/0291791 A1 Oct. 6, 2016

(30) Foreign Application Priority Data

Apr. 1, 2015 (CN) .......................... 2015 1 0152877

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ........ G06F 3/044; G06F 3/0412; G06F 3/041; G06F 3/045; G06F 3/0416; G06F 3/046; G09G 5/006; G09G 2300/0426
See application file for complete search history.

(56) References Cited

U.S. PATENT DOCUMENTS

| 2012/0218199 A1* | 8/2012 | Kim ...................... G06F 3/0412 345/173 |
| 2014/0062944 A1* | 3/2014 | Wang .................... G06F 3/0412 345/174 |

* cited by examiner

*Primary Examiner* — Md Saiful A Siddiqui
(74) *Attorney, Agent, or Firm* — Alston & Bird LLP (57) ABSTRACT

An array substrate, a drive method, a display panel and a display device are provided. The array substrate includes: a first gate line to a N-th gate line arranged along a first direction; a common electrode, partitioned into a plurality of touch-control electrodes independent from each other, where each touch-control electrode includes a plurality of sub-electrodes, and the plurality of sub-electrodes are arranged along the first direction and extend in the direction same as the gate lines; a plurality of touch-control wires; wherein among the gate lines corresponding to any touch-control electrode, the i-th gate line and the (i+1)-th gate line correspond to different sub-electrodes respectively, the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires.

9 Claims, 11 Drawing Sheets

(Prior Art)

ARRAY SUBSTRATE, DRIVE METHOD, DISPLAY PANEL AND DISPLAY DEVICE

CROSS REFERENCE TO RELATED APPLICATION

The present application claims the priority to Chinese Patent Application No. 201510152877.7, titled "ARRAY SUBSTRATE, DRIVE METHOD, DISPLAY PANEL AND DISPLAY DEVICE", filed on Apr. 1, 2015 with the State Intellectual Property Office of People's Republic of China, which is incorporated herein by reference in its entirety.

TECHNICAL FIELD

The disclosure relates to the field of touch display technology, and in particular to an array substrate, a drive method, a display panel and a display device.

BACKGROUND

In the initial developing stage of touch display, a touch display panel is formed by the lamination of a touch panel and a display panel. The touch panel and display panel need to be manufactured separately, which results in high cost, large thickness, and low production efficiency.

With the development of technology of integrated touch-control and display, the common electrode of array substrate in the display panel may be also used as touch-control sensing electrode, to perform touch-control and display-control in time-sharing mode through time-sharing driving, and to allow touch-control and display functions simultaneously. Thus, through integrating the touch-control sensing electrode in the display panel directly, fabrication costs are greatly reduced, production efficiency is improved, and thickness of the panel is reduced.

In a case that the common electrode is further used as the touch-control sensing electrode, the common electrode layer needs to be partitioned into a plurality of independent touch-control electrodes. Meanwhile, to achieve the time-sharing control of touch and display, a separate touch-control wire is needed for each touch-control electrode to provide a touch-control sensing signal. Through the touch-control wire, a touch-control sensing signal is provided for the corresponding touch-control electrode in the touch-control period, and a common voltage is provided for the corresponding touch-control electrode in the display period. However, the display effect of conventional touch display devices is poor.

SUMMARY

In view of this, an array substrate, a display panel and a display device are provided. In the display period, when the gate lines are scanned stage-by-stage, the sub-electrodes corresponding to two adjacent gate lines respectively are isolated from each other and are provided with a common voltage separately, thus the interference between signals is avoided, and display effect of display devices is improved.

To achieve the above-mentioned object, the following technical solutions are provided.

An array substrate, includes:

a first gate line to a N-th gate line arranged along a first direction;

a common electrode, where the common electrode is partitioned into a plurality of touch-control electrodes independent from each other, each touch-control electrode includes a plurality of sub-electrodes, and the plurality of sub-electrodes are arranged along the first direction and extend in the direction same as the gate lines; and a plurality of touch-control wires;

where among the gate lines corresponding to any touch-control electrode, the i-th gate line and the (i+1)-th gate line correspond to different sub-electrodes respectively, the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires, where N is a positive integer greater than or equal to 2, and $1 \leq i < N$.

In addition, a drive method is further provided in the disclosure, to drive the forgoing array substrate. The drive method includes:

scanning the first gate line to the N-th gate line stage-by-stage, where there is an overlap between a period for inputting an enable signal to the i-th gate line and a period for inputting the enable signal to the (i+1)-th gate line.

In addition, a display panel is further provided in the disclosure, where the display panel includes the forgoing array substrate.

Finally, a display device is further provided in the disclosure, where the display device includes the forgoing display panel.

Compared to conventional technology, the technical solutions provided in the disclosure at least have the following advantages.

An array substrate, a drive method, a display panel and a display device according to the embodiments of the disclosure include: a first gate line to a N-th gate line arranged along the first direction; a common electrode, where the common electrode is partitioned into a plurality of touch-control electrodes independent from each other, each touch-control electrode includes a plurality of sub-electrodes, and the plurality of sub-electrodes are arranged along the first direction and extend in the direction same as the gate lines; a plurality of touch-control wires; where among the gate lines corresponding to any touch-control electrode, the i-th gate line and the (i+1)-th gate line correspond to different sub-electrodes respectively, the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires, where N is a positive integer greater than or equal to 2, and $1 \leq i < N$.

It can be learned from the forgoing description that, in the technical solutions according to the embodiments of the disclosure, when driving the array substrate, the first gate line to the N-th gate line are scanned stage-by-stage, where there is an overlap between a period for inputting an enable signal to the i-th gate line and a period for inputting the enable signal to the (i+1)-th gate line, i.e., at the end of a period for scanning the current-stage gate line, the next-stage gate line is pre-charged, and high charging efficiency of the pixel unit corresponding to the next-stage gate line is achieved.

In addition, when the gate line corresponding to any touch-control electrode is scanned, the sub-electrode corresponding to the next-stage gate line is insulated from the sub-electrode corresponding to the current-stage gate line. During the process of scanning the current-stage gate line, a storage capacitor is formed between the pixel electrode corresponding to the current-stage gate line and the sub-electrode corresponding to the current-stage gate line. When the next-stage gate line is pre-charged, a storage capacitor is formed between the pixel electrode corresponding to the next-stage gate line and the sub-electrode corresponding to the next-stage gate line. Since the respective sub-electrodes corresponding to the current-stage gate line and the next-stage gate line are insulated from each other, mutual influences between the respective sub-electrodes corresponding to the current-stage gate line and the next-stage gate line are avoided, and the display effect of the display device is improved.

BRIEF DESCRIPTION OF THE DRAWINGS

In order to illustrate the technical solutions according to the embodiments of the disclosure, the drawings are described briefly hereinafter. Apparently, the drawings described hereinafter are only some embodiments of the present disclosure, and other drawings may be obtained by those skilled in the art according to the provided drawings without any creative effort.

DETAILED DESCRIPTION

Hereinafter, the technical solutions in the embodiments of the present disclosure are described clearly and completely in conjunction with the drawings in the embodiments of the present disclosure. The described embodiments are only a few rather than all of the embodiments of the present disclosure. All the other embodiments obtained by those skilled in the art based on the embodiments of the present disclosure without any creative effort fall within the scope of protection of the disclosure.

As described in the background, the conventional self-capacitive touch display devices have poor display effect. The main reason for the problem lies in the following: in a region corresponding to any touch-control electrode, when the next-stage gate line is pre-charged, both the current-stage gate line and the next-stage gate line are in an on-state, and the pixel electrodes corresponding to the two gate lines respectively share one touch-control electrode. Thus during the process of charging the storage capacitor composed of the pixel electrode corresponding to the current-stage gate line and the touch-control electrode, when a signal is inputted to the pixel electrode corresponding to the next-stage gate line, the pixel electrode corresponding to the next-stage gate line influences the potential of the touch-control electrode and in turn influences the storage capacitor corresponding to the current-stage gate line, thus the display effect of the display device is influenced.

Figure 1:
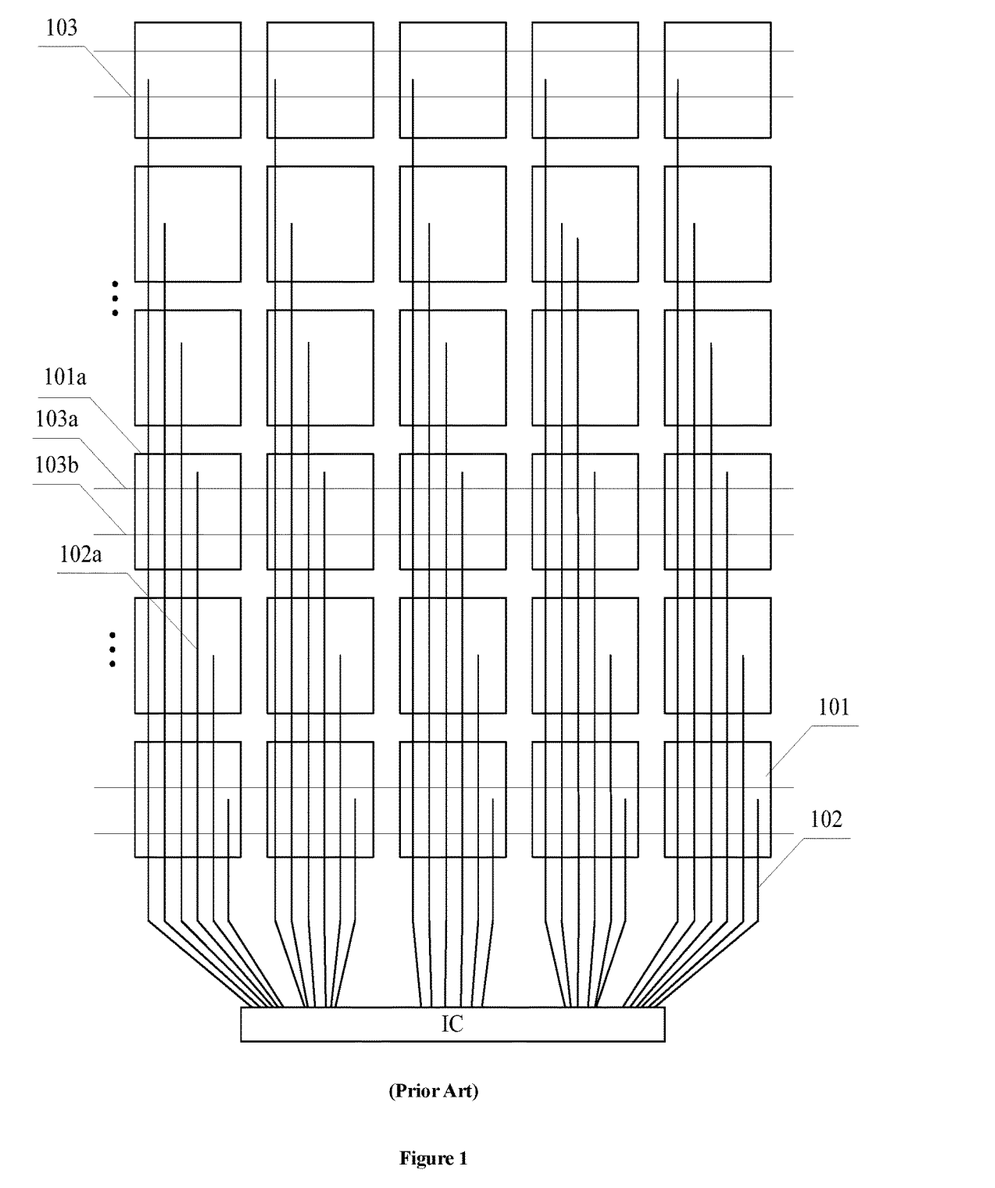
FIG. 1 is a diagram of the touch-control structural of a conventional array substrate.

Referring to FIG. 1, a structural diagram of the touch-control of a conventional array substrate is shown. The array substrate includes a plurality of gate lines 103, a common electrode which is partitioned into a plurality of touch-control electrodes 101 independent from each other. Each touch-control electrode 101 is connected to a driving circuit IC (Integrated Circuit) through a corresponding touch-control wire 102. The driving circuit IC provides a touch-control sensing signal for corresponding touch-control electrode during the touch-control period, and provides a common voltage for corresponding touch-control electrode during the display period. The touch-control sensing signal and the common voltage are transmitted to the corresponding touch-control electrode 101 through touch-control wire 102. Taking the case of touch-control electrode 101a corresponding to two gate lines for example, the touch-control electrode 101a corresponds to a first gate line 103a and a second gate line 103b, and the touch-control electrode 101a transmits signals through the touch-control wire 102a. During the process of scanning the first gate line 103a, a stable capacitor is formed between the pixel electrode corresponding to the first gate line 103a and the touch-control electrode 101a. When the second gate line 103b is pre-charged, a capacitor is formed between the pixel electrode corresponding to the second gate line 103b and the touch-control electrode 101a, and the stable potential of the touch-control electrode 101a is influenced, then the display effect of the display device is influenced.

An array substrate is provided according to an embodiment of the disclosure, in which each touch-control electrode is partitioned into a plurality of sub-electrodes, and respective sub-electrodes corresponding to two adjacent gate lines are provided to be isolated from each other, such that the interference between signals is avoided, and good display effect is achieved. The array substrate according to the embodiment of the disclosure is described in detail in conjunction with FIG. 2 to FIG. 6.

Figure 2:
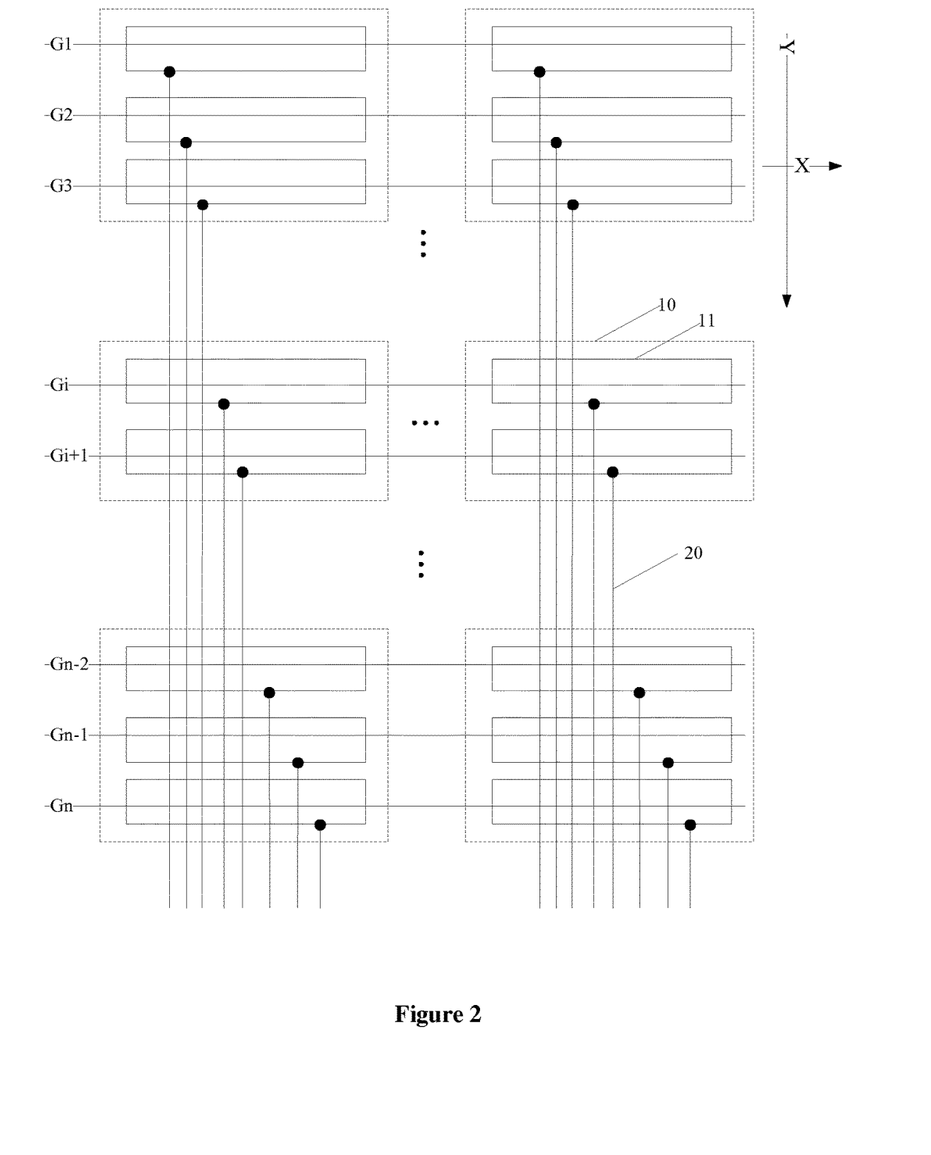
FIG. 2 is a structural diagram of an array substrate according to an embodiment of the disclosure.

Referring to FIG. 2, a structural diagram of an array substrate according to an embodiment of the disclosure is shown. It should be noted that, FIG. 2 only shows a partial structure of the array substrate according to an embodiment of the disclosure. The array substrate includes:

a first gate line G1 to a n-th gate line Gn arranged along a first direction Y (e.g. a vertical direction);

a common electrode, where the common electrode is partitioned into a plurality of touch-control electrodes 10 independent from each other, each touch-control electrode 10 includes a plurality of sub-electrodes 11, the plurality of sub-electrodes 11 are arranged along the first direction Y and extend in the direction same as the gate lines, where the extension direction of the gate lines is the direction X (e.g. a horizontal direction); and a plurality of touch-control wires 20, where all the touch-control wires preferably have the same resistance in order to keep a same signal transmission effect;

among the gate lines corresponding to any one of the touch-control electrodes 10, an i-th gate line Gi and an (i+1)-th gate line Gi+1 correspond to different sub-electrodes respectively, the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires, where N is a positive integer greater than or equal to 2, and $1 \le i < N$.

It should be noted that, in the embodiment of the disclosure, the expression that a gate line corresponds to a sub-electrode means that there is a correspondence between the sub-pixel connected to the gate line and the sub-electrode corresponding to the gate line, that is, a storage capacitor is formed between the pixel electrode connected to the gate line and the sub-electrode corresponding to the gate line. In addition, the size and shape of the touch-control electrode, and the amount of sub-electrodes in the touch-control electrode are not limited herein. For example, referring to touch-control electrodes in FIG. 2, some touch-control electrodes correspond to three sub-electrodes each, and some touch-control electrodes correspond to two sub-electrodes each; this is only one example of the disclosure, and the disclosure is not limited thereto.

It can be learned from the above that, during the process of scanning the current-stage gate line, a storage capacitor is formed between the pixel electrode corresponding to the current-stage gate line and the sub-electrode corresponding to the current-stage gate line. When the next-stage gate line is pre-charged, a storage capacitor is formed between the pixel electrode corresponding to the next-stage gate line and the sub-electrode corresponding to the next-stage gate line. Since the respective sub-electrodes corresponding to the current-stage gate line and the next-stage gate line are insulated from each other, mutual influences between the respective sub-electrodes corresponding to the current-stage gate line and the next-stage gate line are avoided, and the display effect of the display device is improved. It should be noted that, the array substrate according to the embodiment of the disclosure may be a self-capacitive array substrate, i.e., a plurality of touch-control electrodes partitioned from the common electrode are self-capacitive touch-control electrodes.

In addition, in any one of the touch-control electrodes according to the embodiment of the disclosure, the sub-electrodes corresponding to two adjacent gate lines are connected to different touch-control wires respectively; for the connection of the touch-control wires corresponding to respective touch-control electrodes, a first way may be to connect the sub-electrodes corresponding to respective gate lines to touch-control wires independent from each other; or, a second way may be that a plurality of touch-control wires include a plurality of first touch-control wires and a plurality of second touch-control wires, where any one of the touch-control electrodes corresponds to one first touch-control wire and one second touch-control wire, and in any one of the touch-control electrodes, all the sub-electrodes corresponding to odd gate lines are connected to the first touch-control wires, and all the sub-electrodes corresponding to even gate lines are connected to the second touch-control wires; or, a third way may be to adopt the first way for some of the gate lines corresponding to the touch-control electrode, and adopt the second way for some other gate lines for connection; the disclosure is not limited in this aspect and specific design may be used according to the practical application.

Figure 3A:
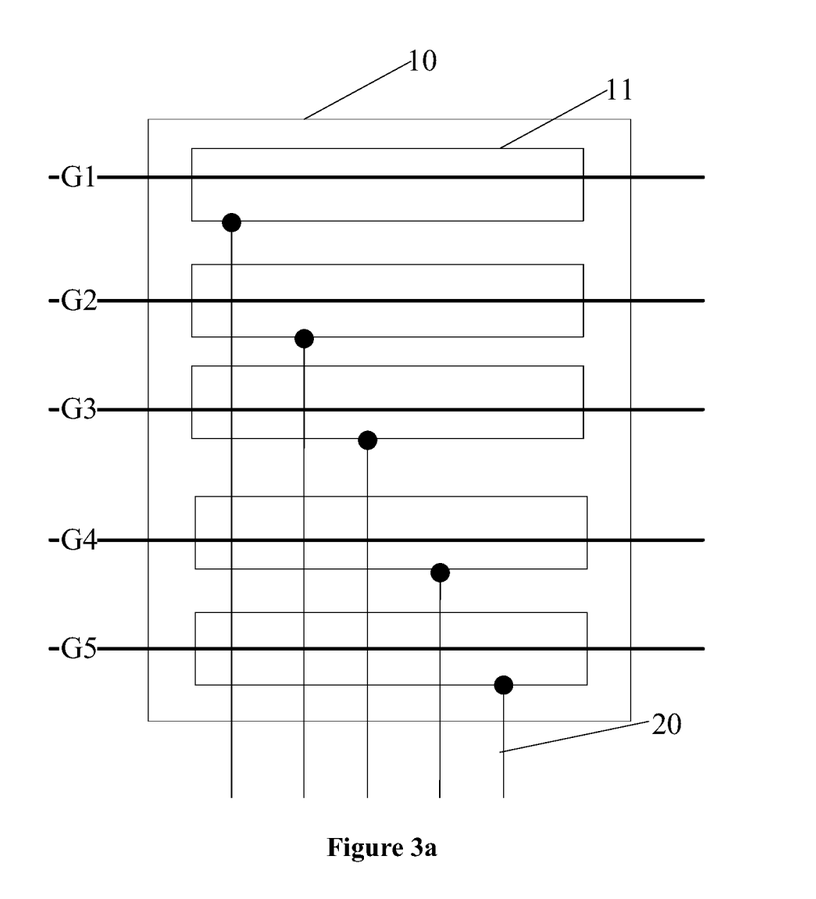
FIG. 3a is a diagram of the connection between touch-control electrodes and touch-control wires according to an embodiment of the disclosure.

Referring to FIG. 3a, a diagram of the connection between touch-control electrodes and touch-control wires according to an embodiment of the disclosure is shown. FIG. 3a illustrates the connection in the first way; the touch-control electrode 10 includes a plurality of sub-electrodes 11, and corresponds to the first gate line G1 to the fifth gate line G5, where each gate line corresponds to a sub-electrode 11, and each sub-electrode 11 is connected to an independent touch-control wire 20. Touch-control wire 20 is used to input a signal to each sub-electrode 11.

Figure 3B:
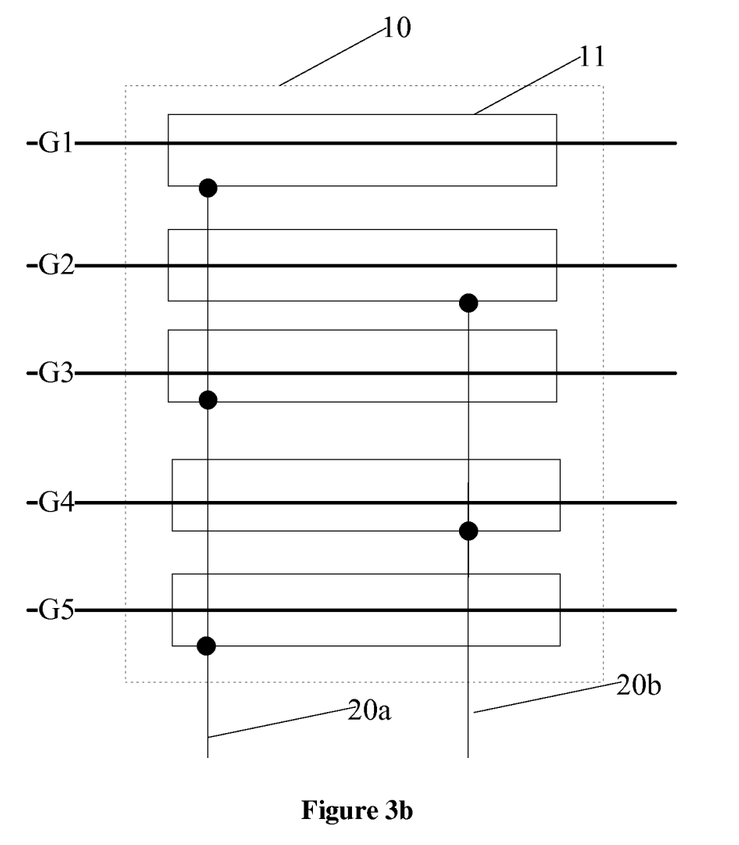
FIG. 3b is a diagram of the connection between touch-control electrodes and touch-control wires according to another embodiment of the disclosure.

Alternatively, referring to FIG. 3b, a diagram of the connection between touch-control electrodes and touch-control wires according to another embodiment of the disclosure is shown. FIG. 3b illustrates the connection in a second way. The touch-control electrode 10 includes a plurality of sub-electrodes 11, and corresponds to the first gate line G1 to the fifth gate line G5, where each gate line corresponds to a sub-electrode 11, the sub-electrodes corresponding to the first gate line G1, the third gate line G3 and the fifth gate line G5 respectively are all connected to the first touch-control wire 20a. The sub-electrodes corresponding to the second gate line G2 and the fourth gate line G4 respectively are both connected to the second touch-control wire 20b. Signals are inputted to the sub-electrodes respectively corresponding to the first gate line G1, the third gate line G3 and the fifth gate line G5 through the first touch-control wire 20a, and signals are inputted to the sub-electrodes respectively corresponding to the second gate line G2 and the fourth gate line G4 through the second touch-control wire 20b.

Figure 3C:
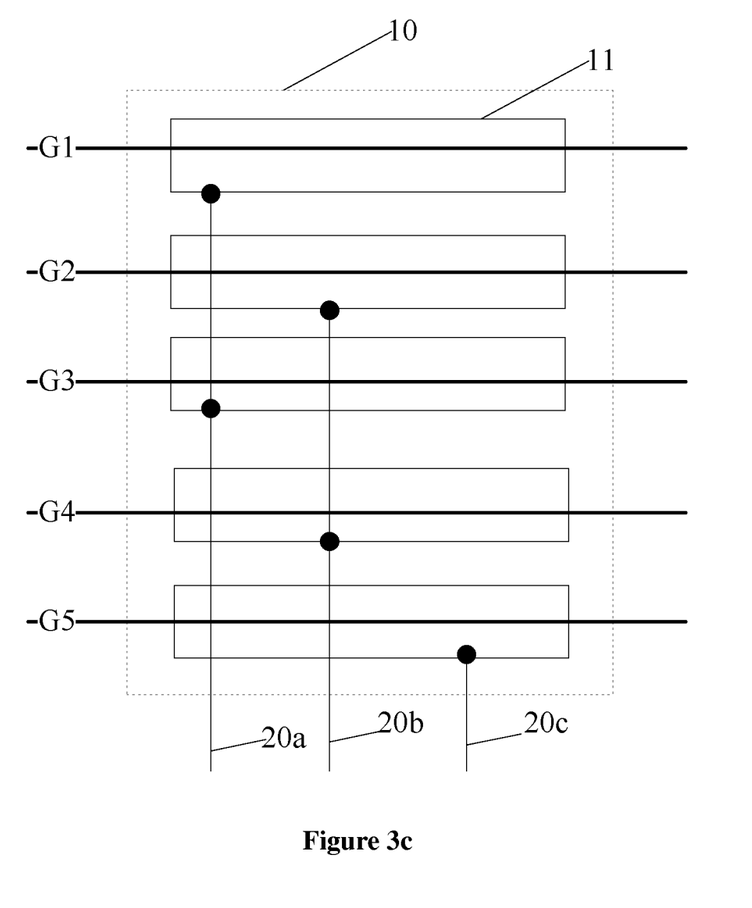
FIG. 3c is a diagram of the connection between touch-control electrodes and touch-control wires according to yet another embodiment of the disclosure.

Alternatively, referring to FIG. 3c, a diagram of the connection between touch-control electrodes and touch-control wires according to yet another embodiment of the disclosure is shown. FIG. 3c illustrates the connection in a third way. The touch-control electrode 10 includes a plurality of sub-electrodes 11, and corresponds to the first gate line G1 to the fifth gate line G5, where each gate line corresponds to a sub-electrode 11, the sub-electrodes respectively corresponding to the first gate line G1 and the third gate line G3 are both connected to the first touch-control wire 20a. The sub-electrodes respectively corresponding to the second gate line G2 and the fourth gate line G4 are both connected to the second touch-control wire 20b, and the sub-electrode corresponding to the fifth gate line G5 is connected to the third touch-control wire 20c. Signals are inputted to the sub-electrodes respectively corresponding to the first gate line G1 and the third gate line G3 through the first touch-control wire 20a, signals are inputted to the sub-electrodes respectively corresponding to the second gate line G2 and the fourth gate line G4 through the second touch-control wire 20b, and the signal is inputted to the sub-electrode corresponding to the fifth gate line G5 through the third touch-control wire 20c.

It should be noted that, according to the embodiment of the disclosure, the sub-electrode corresponding to the i-th gate line and the sub-electrode corresponding to the (i+1)-th gate line are two sub-electrodes adjacent to each other, i.e., the distribution of gate lines and sub-electrodes are as shown in FIG. 3a-FIG. 3c. In addition, according to the embodiment of the disclosure, there are a plurality of sub-electrodes or other electrodes disposed between the sub-electrodes corresponding to the i-th gate line and the (i+1)-th gate line, and the disclosure is not limited in this aspect.

Figure 3D:
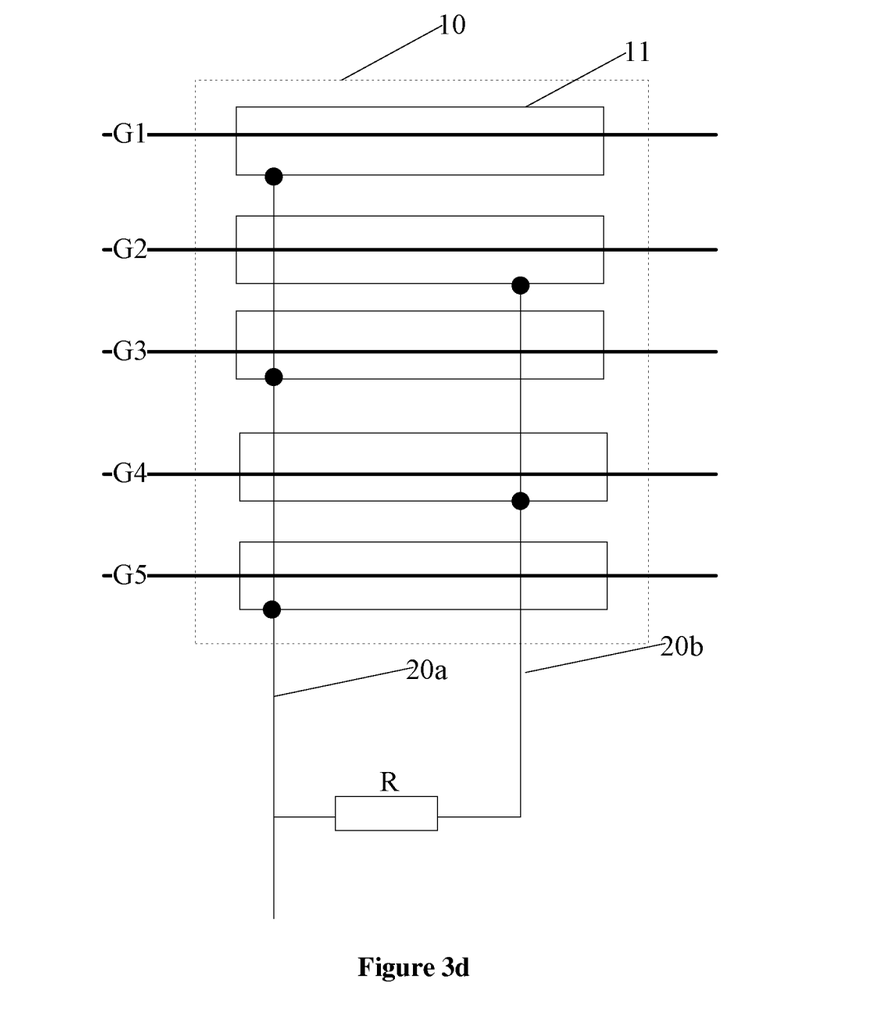
FIG. 3d is a diagram of the connection between touch-control electrodes and touch-control wires according to yet another embodiment of the disclosure.

In addition, For the embodiment disclosed in FIG. 3b, (i.e. the second way), signals are inputted to the first touch-control wire and the second touch-control wire corresponding to an arbitrary touch-control electrode through different signal ports or, the array substrate further includes a plurality of resistors, where the second touch-control wire corresponding to an arbitrary touch-control electrode is connected to the first touch-control wire through resistor(s). The resistance of the resistor is not limited herein and may be determined according to the practical application. Referring to FIG. 3d, an illustration is made based on the touch-control electrodes shown in FIG. 3b, where an end of the first touch-control wire 20a is connected to one end of the resistor R, the other end of the resistor R is connected to an end of the second touch-control wire 20b, and any end of the first touch-control wire 20a and any end of the second touch-control wire 20b are connected to the driving circuit.

For the array substrate according to the embodiment of the disclosure, in any touch-control electrode, there are gaps between all the sub-electrodes, for example, as in the arrangement of the multiple sub-electrodes in the touch-control electrode shown in FIG. 3a-FIG. 3c. In addition, in the array substrate according to an embodiment of the disclosure, the common electrode further includes a plurality of connection electrodes extending along a direction same as the first direction, to connect the sub-electrodes. Specifically, referring to FIG. 4a, a structural diagram of an array substrate according to another embodiment of the disclosure is shown, where the touch-control electrode 10 in the array substrate includes a plurality of sub-electrodes 11, and the common electrode further includes a plurality of first connection electrodes 12 and a plurality of second connection electrodes 13 extending along a direction same as the first direction Y.

Figure 4A:
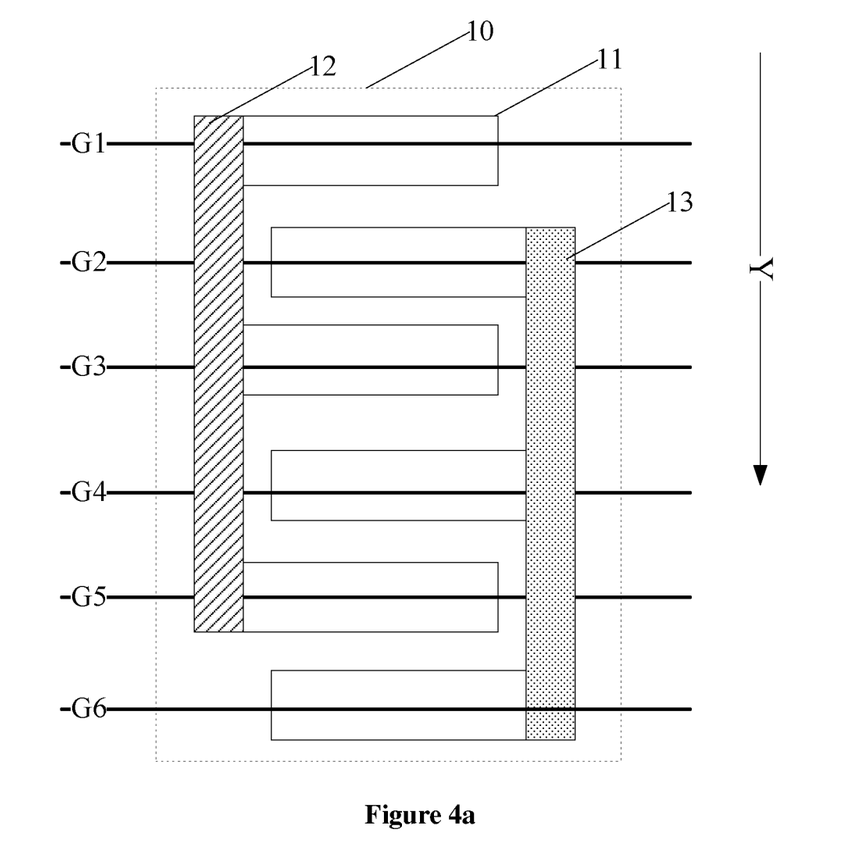
FIG. 4a is a structural diagram of an array substrate according to another embodiment of the disclosure.

In any touch-control electrode 10, the sub-electrodes corresponding to all the odd gate lines are connected through the first connection electrode 12 and sub-electrodes corresponding to all the even gate lines are connected through the second connection electrode 13.

Figure 4B:
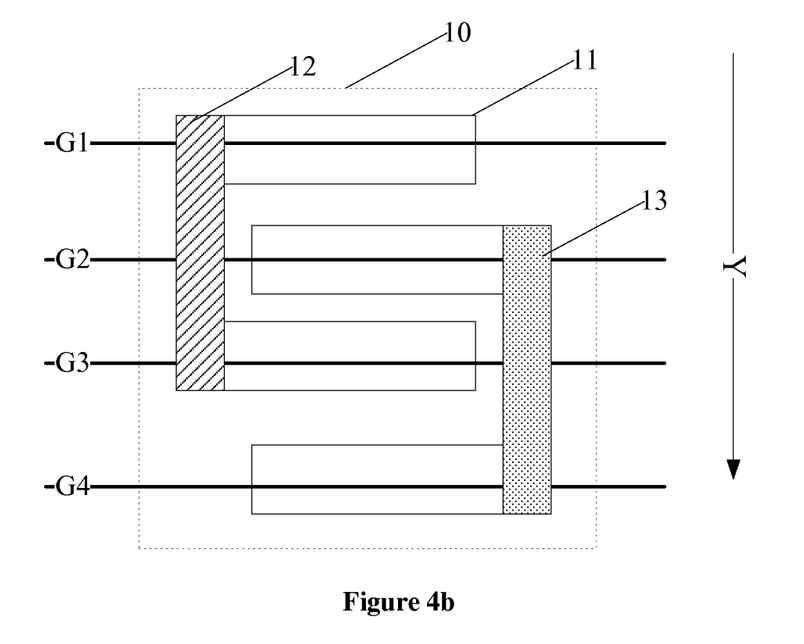
FIG. 4b is a structural diagram of an array substrate according to yet another embodiment of the disclosure.

Alternatively, referring to FIG. 4b, a structural diagram of an array substrate according to yet another embodiment of the disclosure is shown, where the touch-control electrode 10 in the array substrate includes a plurality of sub-electrodes 11, and the common electrode further includes a first connection electrode 12 and a second connection electrode 13 extending along a direction same as the first direction Y.

In any touch-control electrode 10, from first one of odd gate lines, sub-electrodes corresponding to two adjacent odd gate lines are connected through the first connection electrode 12 and from first one of even gate lines, sub-electrodes corresponding to two adjacent even gate lines are connected through the second connection electrode 13.

It should be noted that, the forgoing connections of sub-electrodes in the touch-control electrode are only a few of all the embodiments of the disclosure, the embodiment of the disclosure is not limited in this aspect and specific design may be made according to the practical application.

Figure 5:
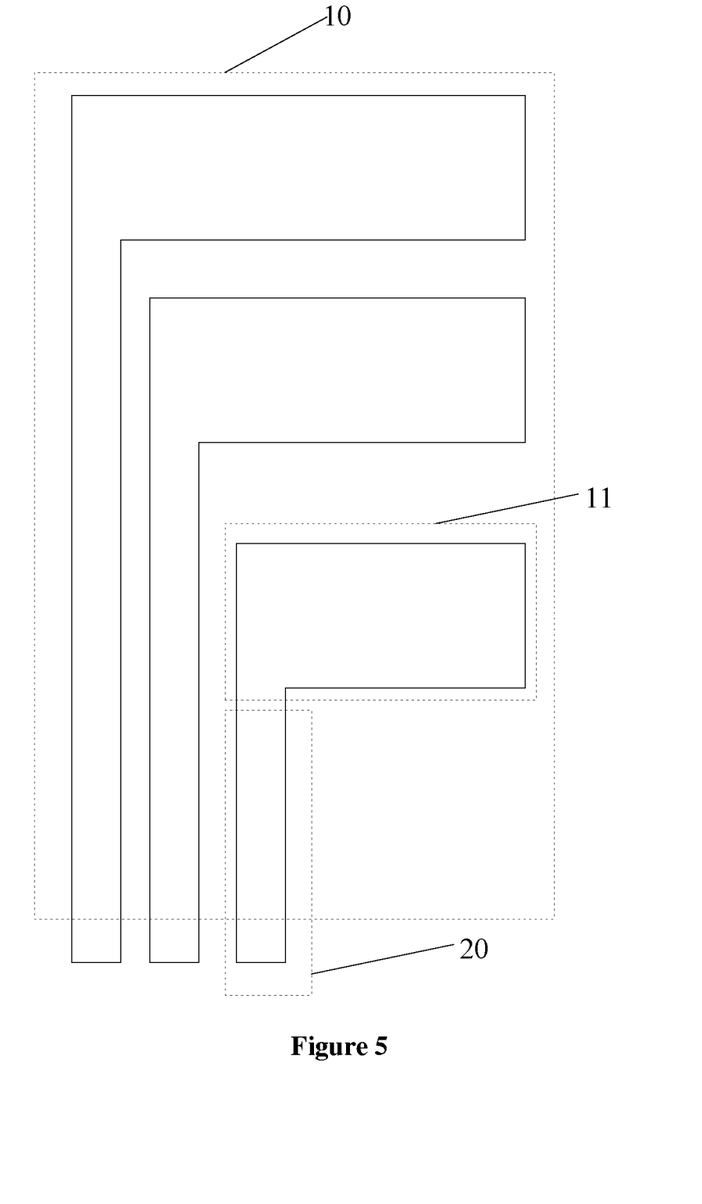
FIG. 5 is a diagram of the connection between touch-control electrodes and touch-control wires according to yet another embodiment of the disclosure.

In the array substrates according to the embodiment of the disclosure, touch-control wires and sub-electrodes may be provided in a same conducting layer. Referring to FIG. 5, a diagram of the connection between touch-control electrodes and touch-control wires according to yet another embodiment of the disclosure is shown, where in a touch-control electrode 10, the end of each sub-electrode 11 may be connected to the touch-control wire 20 provided on the same layer as the sub-electrode, to input signals through the touch-control wire 20.

Figure 6:
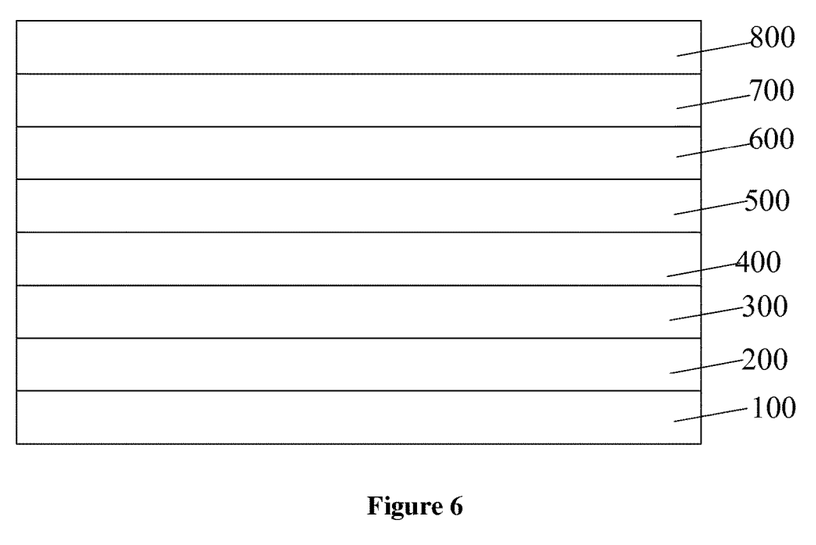
FIG. 6 is a structural diagram of an array substrate according to yet another embodiment of the disclosure.

In addition, touch-control wires and sub-electrodes may be provided in different conducting layers, and touch-control wires may be electrically connected to sub-electrodes through via holes. The type of the array substrate according to the embodiments of the disclosure is not limited. Details are illustrated in conjunction with FIG. 6. In FIG. 6, a structural diagram of an array substrate according to the embodiment of the disclosure is shown, where along a direction of light transmission in the array substrate. The array substrate includes:

a substrate 100;

a first conducting layer 200 provided on a surface of the substrate 100;

a gate dielectric layer 300 provided on a side of the first conducting layer 200 away from the substrate 100;

a second conducting layer 400 provided on a side of the gate dielectric layer 300 away from the substrate 100;

a first insulating layer 500 provided on a side of the second conducting layer 400 away from the substrate 100;

a first electrode layer 600 provided on a side of the first insulating layer 500 away from the substrate;

a second electrode layer 800; and a second insulating layer 700 provided between the first electrode layer 600 and the second electrode layer 800.

The array substrate according to the embodiment of the disclosure may be an array substrate with bottom-gate. In other words, in the array substrate with bottom-gate according to an embodiment of the disclosure, a plurality of gate electrodes are provided on the first conducting layer 200, and a plurality of source electrodes and drain electrodes are provided on the second conducting layer 400. It should be noted that, the array substrate according to an embodiment of the disclosure further includes a semiconductor layer between the gate dielectric layer 300 and the second conducting layer 400, and a plurality of active regions are provided on the semiconductor layer. The corresponding gate electrode, source electrode, drain electrode and active region compose a thin film transistor on the array substrate.

In addition, the array substrate according to the embodiment of the disclosure may be an array substrate with top-gate. In other words, in the array substrate with top-gate according to an embodiment of the disclosure, a plurality of source electrodes and drain electrodes are provided on the first conducting layer 200, and a plurality of gate electrodes are provided on the second conducting layer 400. It should be noted that, the array substrate according to the embodiment of the disclosure further includes a semiconductor layer between the gate dielectric layer 300 and the first conducting layer 200, and a plurality of active regions are provided on the semiconductor layer. The corresponding gate electrode, source electrode, drain electrode and active region compose a thin film transistor on the array substrate.

It should be noted that, in the array substrate according to the embodiment of the disclosure, the locations of the pixel electrode and common electrode are not limited, where a first electrode layer includes the pixel electrode, and a second electrode layer includes the common electrode, or the first electrode layer includes the common electrode, and the second electrode layer includes the pixel electrode.

In addition, the touch-control wires according to the embodiment of the disclosure may be provided on the same layer as the gate lines, or the touch-control wires are provided on the same layer as the data lines, or the touch-control wires are provided on an auxiliary conducting layer. The array substrate further includes the auxiliary conducting layer and a third insulating layer, where the auxiliary conducting layer is located between the substrate and the first conducting layer, and the third insulating layer is located between the auxiliary conducting layer and the first conducting layer or, the auxiliary conducting layer is located between the first insulating layer and the first electrode layer, and the third insulating layer is located between the auxiliary conducting layer and the first electrode layer or, the auxiliary conducting layer is located between the first electrode layer and the second insulating layer, and the third insulating layer is located between the first electrode layer and the auxiliary conducting layer, or the auxiliary conducting layer is located on a side of the second electrode layer away from the substrate, and the third insulating layer is located between the second electrode layer and the auxiliary conducting layer.

In addition, a drive method is provided in the disclosure, for driving the forgoing array substrate. The drive method includes:

scanning the first gate line to the N-th gate line stage-by-stage, where there is an overlap between a period for inputting an enable signal to the i-th gate line and a period for inputting the enable signal to the (i+1)-th gate line.

Figure 7:
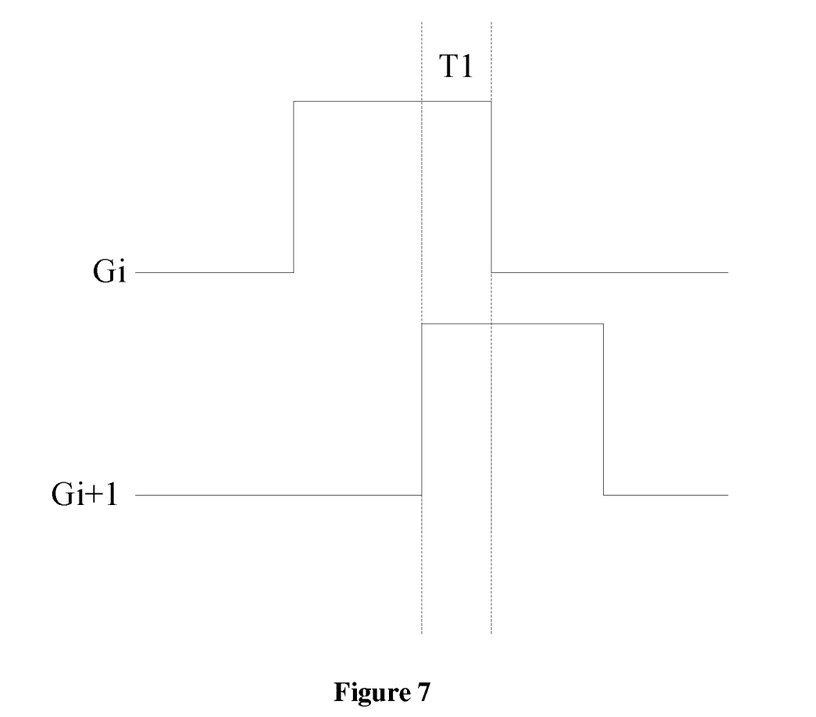
FIG. 7 is a timing sequence chart for scanning according to an embodiment of the disclosure.

Referring to FIG. 7, a timing sequence chart for scanning according to the embodiment of the disclosure is shown. Gi represents the timing sequence of the i-th gate line, and Gi+1 represents the timing sequence of the (i+1)-th gate line, where there is an overlap T1 between a period for inputting the enable signal to the i-th gate line and a period for inputting the enable signal to the (i+1)-th gate line, i.e., during T1, the storage capacitor formed by the pixel electrode and sub-electrode both corresponding to the i-th gate line is in a charging stage, and the storage capacitor formed by the pixel electrode and sub-electrode both corresponding to the (i+1)-th gate line is also in the charging stage, but the sub-electrode corresponding to the i-th gate line is insulated from the sub-electrode corresponding to the (i+1)-th gate line, thus the two do not interfere with each other, and good display effect of the display device is achieved.

In addition, a display panel is provided in the disclosure. The display panel includes the forgoing array substrate.

Finally, a display device is provided in the disclosure. The display device includes the forgoing display panel.

An array substrate, a drive method, a display panel and a display device according to the embodiments of the disclosure include: a first gate line to a N-th gate line arranged along a first direction; a common electrode, where the common electrode is partitioned into a plurality of touch-control electrodes independent from each other, each touch-control electrode includes a plurality of sub-electrodes, and the plurality of sub-electrodes are arranged along the first direction and extend in the direction same as the gate lines; a plurality of touch-control wires; where among the gate lines corresponding to any touch-control electrode, the i-th gate line and the (i+1)-th gate line correspond to different sub-electrodes respectively, the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires respectively, where N is a positive integer greater than or equal to 2, and 1≤i<N.

When driving the array substrate, the first gate line to the N-th gate line are scanned stage-by-stage, where there is an overlap between a period for inputting the enable signal to the i-th gate line and a period for inputting the enable signal to the (i+1)-th gate line, i.e., at the end of the period for scanning the current-stage gate line, the next-stage gate line is pre-charged, and high charging efficiency of the pixel unit corresponding to the next-stage gate line is achieved.

In addition, when the gate line corresponding to any touch-control electrode is scanned, the sub-electrode corresponding to the next-stage gate line is insulated from the sub-electrode corresponding to the current-stage gate line. During the process of scanning the current-stage gate line, a storage capacitor is formed between the pixel electrode corresponding to the current-stage gate line and the sub-electrode corresponding to the current-stage gate line. When the next-stage gate line is pre-charged, a storage capacitor is formed between the pixel electrode corresponding to the next-stage gate line and the sub-electrode corresponding to the next-stage gate line. Since the respective sub-electrodes corresponding to the current-stage gate line and the next-stage gate line are insulated from each other, mutual influences of the two are avoided, and the display effect of the display device is improved.

The forgoing description of the embodiments of the disclosure, is to allow those skilled in the art to implement or use the disclosure. A variety of modifications to the embodiments are apparent for those skilled in the art, and the general principles defined in the disclosure may be implemented in other embodiments without departing from the spirit and scope of the disclosure. Hence, the disclosure is not limited to the embodiments shown in the disclosure, but conforms to a widest scope consistent with the principles and novel features in the disclosure.

What is claimed is:

1. An array substrate comprising:
a first gate line to a N-th gate line arranged in parallel along a first direction and extend in a second direction, wherein N is a positive integer greater than or equal to 2;
a common electrode, wherein the common electrode is partitioned into a plurality of touch-control electrodes to form a touch-control electrode array, each touch-control electrode comprises a plurality of sub-electrodes that are arranged in parallel along the first direction and extend in a same direction as the gate lines;
a plurality of touch-control wires;
wherein among the gate lines corresponding to any touch-control electrode, an i-th gate line and an (i+1)-th gate line correspond to different sub-electrodes; and
wherein the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires, wherein i is a positive integer greater than or equal to 1, but less than N;
wherein the touch-control wires and the sub-electrodes are provided in different conducting layers, and the touch-control wires are electrically connected to the sub-electrodes through via holes;
wherein the plurality of touch-control wires comprise a plurality of first touch-control wires and a plurality of second touch-control wires, and
any one of the touch-control electrodes corresponds to a first touch-control wire and a second touch-control wire, in any touch-control electrode, all the sub-electrodes corresponding to odd gate lines are connected to the first touch-control wire, and all the sub-electrodes corresponding to even gate lines are connected to the second touch-control wire; and
a plurality of resistors, wherein the second touch-control wire corresponding to any touch-control electrode is connected to the first touch-control wire through a resistor.

2. The array substrate according to claim 1, wherein the sub-electrodes corresponding to the i-th gate line and the sub-electrode corresponding to the (i+1)-th gate line are two sub-electrodes adjacent to each other.

3. The array substrate according to claim 1, wherein in any touch-control electrode, there are gaps between all the sub-electrodes.

4. The array substrate according to claim 1, wherein the common electrode further comprises a plurality of first connection electrodes and a plurality of second connection electrodes extending along a direction same as the first direction;
wherein in any touch-control electrode:
sub-electrodes corresponding to all odd gate lines are connected through the first connection electrode; and
sub-electrodes corresponding to all even gate lines are connected through the second connection electrode.

5. The array substrate according to claim 1, wherein the common electrode further comprises a plurality of first connection electrodes and a plurality of second connection electrodes extending along a direction same as the first direction;
in any touch-control electrode:
from first one of odd gate lines, sub-electrodes corresponding to two adjacent odd gate lines are connected through the first connection electrode; and
from first one of even gate lines, sub-electrodes corresponding to two adjacent even gate lines are connected through the second connection electrode.

6. The array substrate according claim 1, wherein different touch-control wires have same resistance.

7. The array substrate according to claim 1, wherein the first gate line to the N-th gate line are scanned stage-by-stage, wherein there is an overlap between a period for inputting an enable signal to the i-th gate line and a period for inputting the enable signal to the (i+1)-th gate line.

8. A display panel comprising an array substrate, wherein the array substrate comprises:
a first gate line to a N-th gate line arranged in parallel along a first direction and extend in a second direction, wherein N is a positive integer greater than or equal to 2;
a common electrode, wherein the common electrode is partitioned into a plurality of touch-control electrodes to form a touch-control electrode array, each touch-control electrode comprises a plurality of sub-electrodes that are arranged in parallel along the first direction and extend in a same direction as the gate lines;
a plurality of touch-control wires;
wherein among the gate lines corresponding to any touch-control electrode, an i-th gate line and an (i+1)-th gate line correspond to different sub-electrodes; and
wherein the sub-electrode corresponding to the i-th gate line is insulated from the sub-electrode corresponding to the (i+1)-th gate line, the sub-electrode corresponding to the i-th gate line and the sub-electrode corresponding to the (i+1)-th gate line are connected to different touch-control wires, wherein i is a positive integer greater than or equal to 1, but less than N;
wherein the touch-control wires and the sub-electrodes are provided in different conducting layers, and the touch-control wires are electrically connected to the sub-electrodes through via holes;
wherein the plurality of touch-control wires comprise a plurality of first touch-control wires and a plurality of second touch-control wires, and
any one of the touch-control electrodes corresponds to a first touch-control wire and a second touch-control wire, in any touch-control electrode, all the sub-electrodes corresponding to odd gate lines are connected to the first touch-control wire, and all the sub-electrodes corresponding to even gate lines are connected to the second touch-control wire; and
a plurality of resistors, wherein the second touch-control wire corresponding to any touch-control electrode is connected to the first touch-control wire through a resistor.

9. A display device comprising the display panel according to claim claim 8.

* * * * *